INVENTOR.
SOLOMON ZAROMB

BY

ALAN K. ROBERTS
ATTORNEY

United States Patent Office 3,378,396
Patented Apr. 16, 1968

3,378,396
CONDUCTIVE OXIDE-COATED ARTICLES
Solomon Zaromb, 376 Monroe St.,
Passaic, N.J. 07055
Continuation of application Ser. No. 293,450, July 8, 1963. This application Mar. 27, 1967, Ser. No. 626,337
1 Claim. (Cl. 117—123)

ABSTRACT OF THE DISCLOSURE

A transparent conductive article comprises a silicon-base light-permeable substrate coated with tin and silicon oxides varying gradually in composition from the coating-substrate interface to the outer surface of the coating, the coating being about 100% silicon dioxide at said interface, being a mixture of up to 60% silicon dioxide and not less than 40% stannic oxide at said outer surface, and being about 100% stannic oxide part way between said surfaces. Said article may be obtained by simultaneously directing separate sprays of a tin chloride solution and of a silicon chloride solution onto a heated substrate so as to thermally convert the chlorides to oxides, and gradually varying the ratio of the sprays to each other to vary the ratio of the oxides.

---

This is a streamlined continuation of application Serial No. 293,450, filed July 8, 1963, now superseded.

This invention relates to conductive tin oxide coatings and related articles and methods.

It is an object of the invention to provide an improved tin oxide coating and related articles of manufacture and methods.

It is known that conductive tin oxide coatings on glass, quartz, ceramic and other silicon-base light-permeable substrates are light-reflecting rather than light absorbing. This reflectivity arises from the large difference between the refractive index of the tin oxide and the adjacent substrate and ambient air or electrolyte in certain types of apparatus.

In order to reduce this reflectivity, I propose to form conductive tin oxide coatings of graded composition starting with a high silicon oxide to tin oxide ratio, then gradually changing to almost pure tin oxide and finally reverting again to a suitable silicon oxide to tin oxide ratio near the outer surface so that the variation of refractive index compared with depth within the coating takes on a form which I have found to be preferred.

Figure 1:
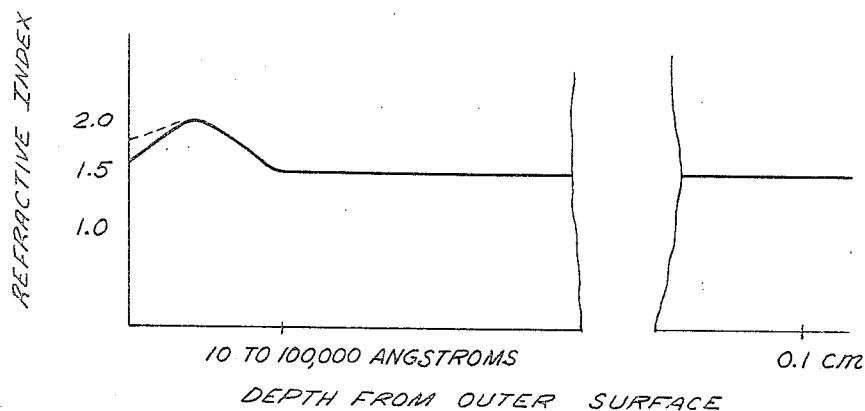
Figure 2:
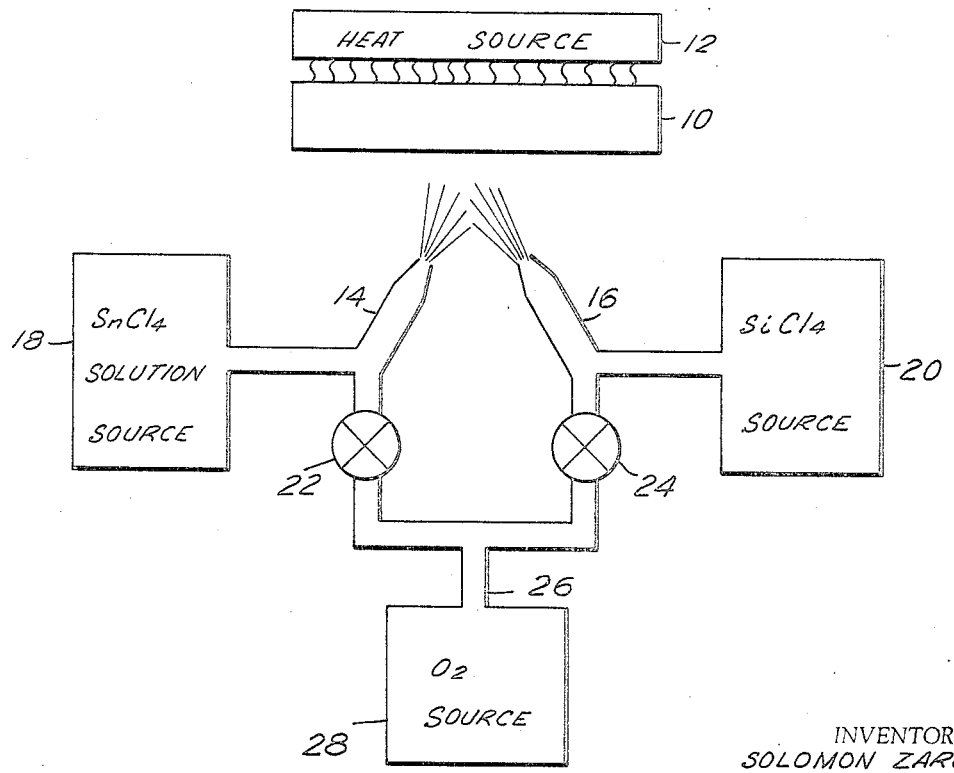

My invention will be more specifically explained with reference to the accompanying drawing in which:

FIGURE 1 is a chart illustrating the refractive index within a coating provided in accordance with my invention; and FIGURE 2 diagrammatically shows an apparatus by means of which a coating can be applied to a substrate in accordance with my invention.

Generally speaking, my invention provides a coating for a silicon-base light-permeable substrate, said coating comprising a mixture of tin and silicon oxides in amounts which vary from the coating surface in contact with the substrate to the outer surface of the coating. This coating is of about 100% silicon dioxide at the surface in contact with the substrate and about 40–100% stannic oxide at the outer surface thereof. Approximately midway between the surfaces the coating consists of a mixture of about 0–60% silicon dioxide and 40–100% stannic oxide and being of about 100% stannic oxide approximately midway between said surfaces. The ratio of oxides changes gradually between the aforesaid percentages and surfaces.

My improved coating finds use, for example, in coated glasses wherein an electrical current is applied for ice melting purposes, and is also useful in light shutters where electrochemical deposition techniques are employed. There are various other uses for which the invention may be employed.

Referring to FIG. 1, there is illustrated in this figure a chart showing refractive index versus depth in the coating from the outer surface thereof.

The refractive index is shown in the area of 1.0 to 2.0. The refractive index 1.5 represents pure silicon oxide ($SiO_2$). The refractive index 2.0 represents pure tin oxide ($SnO_2$).

That portion of the curve extending along a straight line at the refractive index of 1.5 represents the refractive index of the substrate. This substrate which as noted above is a silicon-base light-permeable substrate may, for example, be of glass, quartz, ceramics, and so forth.

At the outer surface of the coating represented by the ordinate, the refractive index may vary according to needs and as would result from a mixture of 0–60% of silicon oxide and 40–100% of tin oxide, a possible variation being shown in dotted lines.

The curve shown in FIG. 1 as provided by a coating consisting of about 100% silicon oxide at the surface in contact with the substrate and being of a mixture of about 0–60% silicon oxide and 40–100% tin oxide at the outer surface, the coating consisting of about 100% tin oxide midway between the aforesaid surfaces.

A method for applying the aforesaid coating to a substrate is illustrated in FIG. 2 wherein is shown a substrate 10 consisting of glass, quartz, ceramics or a like material, said substrate being positioned adjacent a heat source 12 intended to bring the temperature of the substrate to about 500–1000° C.

Directed at the substrate 10 are two nozzles 14 and 16 being respectively connected to a tin chloride solution source 18 and a silicon chloride source 20.

Each of the nozzles 14 and 16 is respectively coupled to a control valve 22 and 24, these control valves being connected via a line 26 to a source of oxygen 28 adapted for supplying an oxygen containing gas such as perhaps air.

Valves 22 and 24 are utilized to control the ratio of the chlorides directed against the heated substrate 10 which, by virtue of being heated and due to the presence of oxygen causes the chlorides to be reduced to oxides.

There are very many tin chloride solutions which are available for the purposes, one of these being, for example, a solution comprising antimony trichloride water and hydrochloric acid, as well as tin chloride.

The method indicated above for providing the article indicated above and the coating therefor is essentially a method for reducing the light reflectivity of a tin oxide coating on a silicon base substrate by merging the coating with the substrate through the intermediary of a mixture of tin oxide and silicon oxide of gradually varying ratio.

What is claimed is:

1. An article comprising a silicon-base light-permeable substrate and a coating containing tin and silicon oxides in amounts which vary gradually from the coating-substrate interface to the outer surface of the coating, said coating being about 100% silicon dioxide at said interface, being a mixture of up to 60% silicon dioxide and not less than 40% stannic oxide at said outer surface, and being mostly stannic oxide part way between said surfaces.

References Cited

UNITED STATES PATENTS

| | | | |
|---|---|---|---|
| 3,326,715 | 6/1967 | Twells | 117—124 |
| 2,380,827 | 7/1945 | Downs | 299—58 |
| 2,570,245 | 10/1951 | Junge | 117—105 |
| 2,571,608 | 10/1951 | Plagge | 49—81 |
| 2,602,032 | 7/1952 | Gaiser | 117—69 |
| 2,617,745 | 11/1952 | Raymond et al. | 117—69 |
| 3,004,875 | 10/1961 | Lytle | 117—211 |
| 3,042,542 | 7/1962 | Anders | 117—33.3 |
| 3,176,574 | 4/1965 | Socha | 88—1 |
| 3,203,830 | 8/1965 | Ostrander et al. | 117—227 |
| 3,306,768 | 2/1967 | Peterson | 117—106 |

MURRAY KATZ, *Primary Examiner.*

WILLIAM D. MARTIN, *Examiner.*

W. D. HERRICK, *Assistant Examiner.*